United States Patent [19]
Kohnke

[11] Patent Number: 4,484,896
[45] Date of Patent: Nov. 27, 1984

[54] SIMULATOR FOR PRACTICING TRACHEAL INTUBATION

[75] Inventor: Ole B. Køhnke, Lyngby, Denmark

[73] Assignee: Testa-Laboratorium A/S, Glostrup, Denmark

[21] Appl. No.: 490,542

[22] Filed: May 2, 1983

[30] Foreign Application Priority Data

May 4, 1982 [DK] Denmark .............................. 2001/82

[51] Int. Cl.³ ............................................. G09B 23/32
[52] U.S. Cl. .................................................. 434/265
[58] Field of Search ........................ 434/265, 267, 270

[56] References Cited

U.S. PATENT DOCUMENTS 3,520,071 7/1970 Abrahamson et al.
3,874,093 4/1975 Garbe .................................... 434/265
4,209,919 7/1980 Kirikae et al. ....................... 434/270

OTHER PUBLICATIONS

British Journal of Anaesthesia, No. 45, 1973, Altrincham T. Howells et al., "Endotrachael Intubation Training Using a Simulator", pp. 400–402.

Primary Examiner—Harland S. Skogquist
Attorney, Agent, or Firm—Watson, Cole, Grindle & Watson

[57] ABSTRACT

Simulator for practicing tracheal intubation comprising a manikin head attached to a support and having a skull comprising a movable lower jaw, and a neck connected to the skull and support so as to allow the manikin head to be tilted forwards and backwards, the simulator having an oral cavity and a throat comprising a thin-walled funnel-shaped element having at its upper edge a convex tongue element attached to the lower jaw and having at its lower end two ducts one simulating a trachea and the other simulating a gullet.

3 Claims, 4 Drawing Figures

SIMULATOR FOR PRACTICING TRACHEAL INTUBATION

BACKGROUND OF THE INVENTION

This invention relates to a simulator for practising tracheal intubation, the simulator comprising a manikin head attached to a support with the face turning away from the support and having a skull comprising a movable lower jaw, and a neck which is connected to the skull and the support in such a manner that the manikin head can be tilted forwards and backwards.

Tracheal intubation is a procedure which is used to establish a free airway to the lungs of a patient e.g. a patient who is unconscious and whose respiration has to be assisted by artificial lung ventilation. Tracheal intubation comprises inserting a non-collapsible flexible cuffed tracheal tube e.g. a rubber tube into trachea and then inflating the cuff with air so as to establish a seal between the exterior surface of the tracheal tube and the walls of trachea.

When tracheal intubation has been performed as described, the patient's lungs will be in direct communication with the free air and the patient's mouth and throat will be separated from said free passage so that vomit liquid, blood or secretion are prevented from passing into the trachea and the lungs.

Tracheal intubation should be performed rapidly and safely i.e. because the patient ordinarily is unconscious when the procedure is performed. A rapid and safe tracheal intubation requires that the person performing it has been carefully trained and since such training can be performed on live patients only in rare cases, special simulators for practising tracheal intubations have been developed. Such a simulator is described in the British Journal of Anasthesia, No. 45, 400 (1973), the simulator comprising a manikin head and neck in which the parts simulating the entry to the trachea, the rear part of the palate and the pharyngeal ligaments adjacent the epiglottis comprise separate elements which move independently of one another.

Due to such independent movement the well known simulator does not give a realistic impression of the problems which in practice are involved when performing tracheal intubation.

In practice the tissue forming the rear part of the oral cavity is strongly stretched when the patient's tongue is pressed against the lower jaw to allow the operator to observe the entrance to the trachea. Such stretching cannot be simulated by using synthetic elastic materials and, therefore, it has been necessary to accept a less realistic solution comprising the use of separate and independently movable elements in the rear part of the oral cavity and the throat.

SUMMARY OF THE INVENTION

The main object of the invention is to provide a simulator of the above-mentioned type capable of realistically simulating the movement and the relative location of a patient's tongue, throat and larynx when practising tracheal intubation.

The simulator of the invention comprises a manikin head in which the oral cavity and throat are composed of a thin-walled funnel-shaped element comprising a highly elastic material, the funnel-shaped element having at its upper front edge a convex tongue element having a front portion which is permanently attached to the inside of the movable lower jaw, and at its rear edge means for attaching the funnel-shaped element to the underside of the skull, the lower portion of the funnel-shaped element comprising a front duct of essentially circular cross-section and being connected with one end of a non-collapsible tube, which at its opposite end is hinged to the support and a rear duct of essentially oval cross-sectional shape, a flap extending from the inner surface of the funnel-shaped element and having the shape similar to that of the epiglottis being provided in the zone adjacent the entrance to the front duct.

The use of a funnel-shaped element of a highly elastic material and the manner in which the element is attached to the manikin head makes it possible to establish conditions similar to those existing in the human throat in the zone between the root of the tongue and the entrance to the gullet or esophagus when the manikin head is tilted backwards and a laryngoscope is inserted into the mouth cavity of the manikin head and the tip of the laryngoscope is placed in a position in which the tip is located a short distance above the flap while pressing the convex tongue element against the lower jaw by means of the blade of the laryngoscope. Thus the conditions established realistically simulate the start position when performing tracheal intubation on a living patient. When using the simulator of the invention the operator is able to observe that part of the front duct which correspond to the zone in which the vocal chords are located in a living patient.

In order to make the practising of tracheal intubation as realistic as possible a flap having the shape of a vocal chord may be provided within the funnel-shaped element at each side of the upper part of the front duct.

As mentioned above the funnel-shaped element comprise a highly elastic material. Examples of such a material are rubber and plasticized PVC. When the funnel-shaped material comprises an elastomeric material having a Shore A hardness of 30–50, it preferably has a wall thickness of between 1.5 and 4 mm.

DESCRIPTION OF THE PREFERRED EMBODIMENTS

Figure 1:
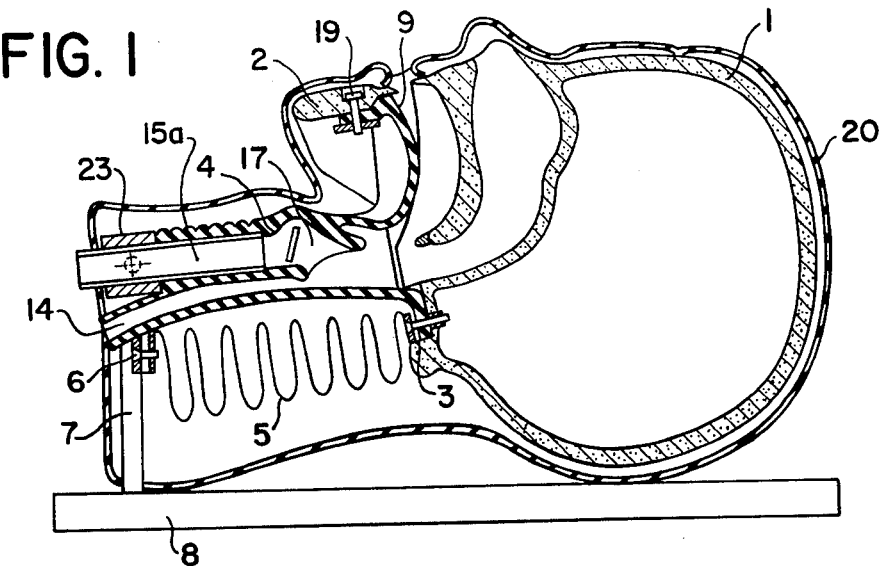
FIG. 1 is a sectional view of a preferred embodiment of a simulator of the invention.
Figure 2:
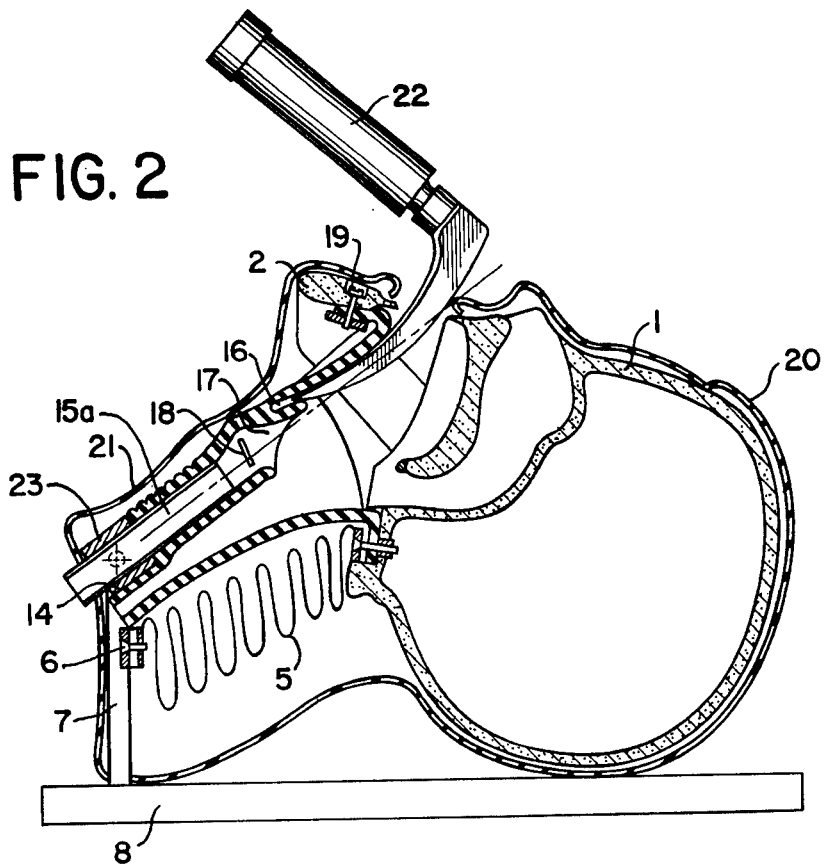
FIG. 2 is a sectional view of the simulator according to FIG. 1 seen in the starting position for the insertion of a tube into trachea.
Figure 3:
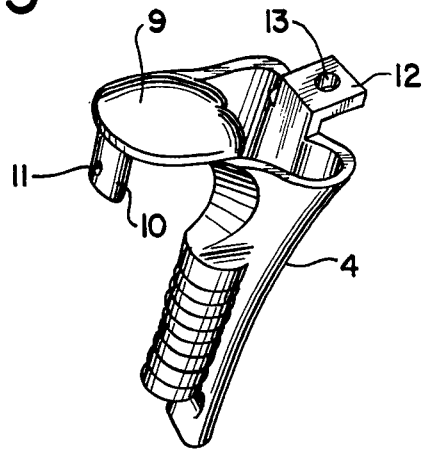
FIG. 3 is a perspective view of a funnel-shaped element of a simulator of the invention.
Figure 4:
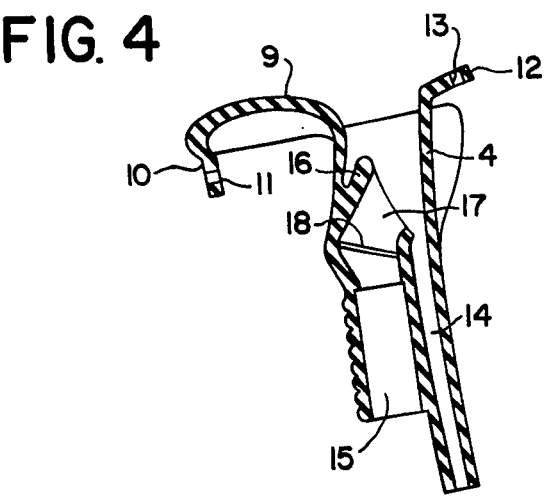
FIG. 4 is a sectional view of the funnel-shaped element shown in FIG. 3.

The simulator illustrated in FIG. 1 and FIG. 2 comprises a skull 1 having a movable lower jaw 2 connected to the main part of the skull 1 via an articulation (not shown). A funnel-shaped element 4 (cf. FIG. 3 and FIG. 4) of a highly elastic material has at one end an articulate element 5 which is flexible in the plane of the section illustrated, and is attached to the underside of the skull 1 by means of a screw 3. Another screw connection 6 serves to attach the opposite end of the articulate element 5 to a plate 7 mounted perpendicular to a support 8. The funnel-shaped element 4 illustrated in FIG. 3 and FIG. 4 comprises at its wide end a convex tongue element 9 having a flap 10 including a hole 11. At the opposite edge of the funnel-shaped element 4 a second flap 12 is provided also having a hole 13. As will appear from FIG. 4, the funnel-shaped element 4 also comprises two ducts of which a first one 14 has an essentially oval cross-sectional shape and the second one 15 has a circular cross-sectional shape. At the entrance 17 to the duct 15 there is provided a protruding flap 16 having a shape corresponding to that of an epiglottis and the upper part of the duct 15 is inclined relative to the longitudinal axis of the element 4 so as to simulate the entrance to the larynx of a living patient in a rest position. Flaps 18 simulating vocal chords are provided on the interior surface of the duct 15.

The flap 12 having the hole 13 serves to attach the funnel-shaped element 4 to the skull 1 by means of the screw 3.

The flap 10 having the hole 11 and the screw connection 19 serve to attach the convex tongue element 9 to the inside of the lower jaw 2.

The circular shape of the duct 15 makes it possible to attach the funnel-shaped element to a non-collapsible tube 15a which is connected to the plate 7 (cf. FIG. 1 and FIG. 2) via a hinge 23.

The simulator illustrated further comprises a skin like cover 20 for the skull 1. The cover 20 comprises a neck-shaped extension surrounding the articulate element 5 and that part of the funnel-shaped element which extends from the underside of the skull 1.

Due to the special shape of the funnel-shaped element 4 it can be bent perpendicular to its longitudinal axis when the manikin head is in the rest position illustrated in FIG. 1. In this position the longitudinal axis of the oral cavity is substantially perpendicular to the longitudinal axis of the ducts simulating the trachea and the gullet or esophagus.

The unrealistic lateral bulging of the funnel-shaped element does not disturb the operator's impression of the relative location and movements of the various parts in this characteristic position.

As shown in FIG. 2 the skull 1 can be tilted backwards and the lower jaw 2 can be moved away from the remaining part of the skull so as to enable an operator to introduce the blade of a laryngoscope 22 into the oral cavity of the manikin head and to place the tip of the blade in the funnel-shaped element 4 in a position close to the flap 16. When the blade of the laryngoscope from the starting position is pressed against the lower jaw 2, the special shape and attachment of the funnel-shaped element 4 and the convex tongue element 9 will allow the operator to look through the mouth and throat of the manikin head into the duct 15 thus establishing a condition which simulates the starting position when performing tracheal intubation.

After having established the condition described tracheal intubation may be practiced by introducing a tracheal tube into the mouth and throat of the manikin head and into the entrance 17 to the duct 15 simulating the trachea.

I claim:

1. A simulator for practising tracheal intubation comprising a manikin head attached to a support with the face turning away from said support and having a skull comprising a movable lower jaw, and a neck connected to the skull and the support in such a manner that the manikin head can be tilted forwards and backwards, characterized in that the oral cavity and throat of the manikin head are composed of a thin-walled funnel-shaped element comprising a highly elastic material, said funnel-shaped element having at its upper front edge a convex tongue element having a front portion which is permanently attached to the inside of the movable lower jaw, and at its rear edge means for attaching the funnel-shaped element to the underside of the skull, the lower portion of said funnel-shaped element comprising a front duct of essentially circular cross-section and being connected with one end of a non-collapsible tube, which at its opposite end is hinged to the support and a rear duct of essentially oval cross-sectional shape, a flap extending from the inner surface of the funnel-shaped element and having the shape similar to that of epiglottis being provided in the zone adjacent to the entrance of the front duct.

2. A simulator as in claim 1, characterized in that the funnel-shaped element comprises one of rubber or plasticized PVC material.

3. A simulator as in claim 2, characterizied in that the front duct comprises a flap having the shape of a vocal chord provided at each side of its upper part at its upper end.

* * * * *